United States Patent [19]

Hagberg

[11] 3,845,357

[45] Oct. 29, 1974

[54] PROTECTIVE RELAYING APPARATUS OF THE UNBLOCK TYPE

[75] Inventor: John E. Hagberg, Mountain Lakes, N.J.

[73] Assignee: Westinghouse Electric Corporation, Pittsburgh, Pa.

[22] Filed: May 29, 1973

[21] Appl. No.: 364,449

[52] U.S. Cl. ............................. 317/27 R, 317/29 A
[51] Int. Cl. ............................................. H02h 7/26
[58] Field of Search ................... 317/27 R, 28 R, 29

[56] References Cited
UNITED STATES PATENTS

| 3,273,017 | 9/1966 | Mathews | 317/29 R |
| 3,277,343 | 10/1966 | Seeley | 317/29 R |
| 3,312,866 | 4/1967 | Rockefeller, Jr. | 317/28 R |

OTHER PUBLICATIONS

Type Stu Unblock Relay, Westinghouse, I.L. 41-959-.4A, Instruction Manual, effective January 1970, Westinghouse Electric Corp., Relay-Instrument Div., Newark, N.J.

Primary Examiner—J. D. Miller
Assistant Examiner—Patrick R. Salce
Attorney, Agent, or Firm—J. L. Stoughton

[57] ABSTRACT

Protective relaying apparatus for power transmission lines of the unblocking type which utilizes a fault signal from a remote portion of the protected line to initiate a normal transient blocking timer which in the absence of a local fault signal (within its timing period) will initiate a desensitizing operation and prevent the tripping of the local breaker due to the presence of transient and an additional timer arranged to be energized in response to a local fault signal and effective when timed out to initiate the normal transient blocking timer in the absence of the remote fault signal. In a modified form of the apparatus, the concurrent reception of the received and local signals (indicative of a fault in the line section protected thereby) deactivates the normal timer and prevents its further timing operation to increase the margin of coordination when transient blocking should not occur.

25 Claims, 8 Drawing Figures

FIG. 3.
*PRIOR ART*

| TIME | BREAKER OPENS | LOCATION "A" |||||||| LOCATION "B" |||||| LOCATION "C" |||||| LOCATION "D" ||||||
|---|---|---|---|---|---|---|---|---|---|---|---|---|---|---|---|---|---|---|---|---|---|---|---|---|---|---|
| | | FAULT | RECEIVER | TRANSMITTER | FD 1 | FD 2 | TD 1 | TD 2 | TD 3 | RECEIVER | TRANSMITTER | FD 1 | TD 1 | TD 2 | TD 3 | RECEIVER | TRANSMITTER | FD 1 | TD 1 | TD 2 | TD 3 | RECEIVER | TRANSMITTER | FD 1 | TD 1 | TD 2 | TD 3 |
| 0 | | X | | X | X | X | T | | | | | | | | | | | | | | | | | | | | |
| 1 | | | | | | | | | | | | | | | | | | | | | | | | | | | |
| 2 | | | | | | | | | | | | | | | | | | | | | | | | | | | |
| 3 | | | | | | | | | | | | | | | | | | | | | | | | | | | |
| 4 | | | | | | | | | | | | | | | | | | | | | | | | | | | |
| 5 | | | | | | | | | | | | | | | | | | | | | | | | | | | |
| 6 | | | | | | | | | | | | | | | | | | | | | | | | | | | |
| 7 | | | | | | | | | | | | | | | | | | | | | | | | | | | |
| 8 | | | | | | | | | | X | X | X | T | T | | | | | | | | X | X | T | | | |
| 9 | | | | | | | | | | | | | | | | | | | | | | | | | | | |
| 10 | | | | | | | | | | | | | | | | | | | | | | | | | | | |
| 11 | | | | | | | | | | | | | | | | | | | | | | | | | | | |
| 12 | | | | | | | | | | | | | | | | | | | | | | | | | | | |
| 13 | | | | | | | | | | (MIN) | X | | | | | | | | | | | | | | | | |
| 14 | | | | | | | | | | | | | | | | | | | | | | | | | | | |
| 15 | | | | | | | | | | | | | | | | | | | | | | | | | | | |
| 16 | | | X | | | X | T | T | | | | | | | | X | | | T | | | | | | | | |
| 17 | | | | | | | | | | | | | | | | | | | | | | | | | | | |
| 18 | | | | | | | | | | | | | | | | | | | | | | | | | | | |
| 19 | | | | | | | | | | | | | | | | | | | | | | | | | | | |
| 20 | | | | | | | | X | | (MAX) | X | | | | | | | | | | | | | | | | |
| 21 | | | | (MIN) | X | | | | | | | | | | | | | | | | | | | | | | |
| 22 | | | | | | | | | | | | | | | | | | | | | | | | | | | |
| 23 | | | | | | | | | | | | | | | | | | | | | | | | | | | |
| 24 | | | | | | | | | | | | | | | | | | | | | | | X | T | | | |
| 25 | A | | | | | | | | | | | | | | | | | | | | | | | | | | |
| 26 | | | | | | | | | | | | | | | | X | X | | | T | | | | | | | |
| 27 | | | | | | | | | | | | | | | | | | | | | | | | | | | |
| 28 | | | | (MAX) | X | | | | | | | | | | | (MAX) | X | | | | | | | | | | |
| 29 | | | | | | | | | | | | | | | | | | | X | | | | | | | | |
| 30 | | | | | | | | | | | | | | | | | | | | | | | | | | | |
| 31 | | | | | | | | | | | | | | | | | | | | | | | | | | | |
| 32 | | | | | | | | | | | | | | | | | | | | | | | | | | | |
| 33 | | | | | | | | | | | | | | | | | | | | | | X | | | T | | |
| 34 | | | | | | | | | | | | | | | | | | | | | | | | | | | |
| 35 | | | | | | | | | | | | | | | | | | | | | | | | | | | |
| 36 | | | | | | | | | | | | | | | | | | | | | | | (MAX) | X | | | |
| 37 | | | | | | | | | | | | | | | | | | | | | | | | | X | | |
| 38 | | | | | | | | | | | | | | | | | | | | | | | | | | | |

PROTECTIVE RELAYING APPARATUS OF THE UNBLOCK TYPE

BRIEF SUMMARY OF THE INVENTION

The invention is especially useful in protective relaying apparatus used to protect parallelly arranged transmission lines and consists in the use of a second timer actuable under certain fault conditions to determine the time interval that the normal transient blocking timer is inserted. It is especially desirable when the time required for the signals which are transmitted between the remote and local end portions of the lines is relatively long and the breaker opening time is short.

BRIEF DESCRIPTION OF THE DRAWINGS

FIGS. 3, 4 and 5 are time charts useful in explaining the invention;

BRIEF DESCRIPTION OF THE PREFERRED EMBODIMENT

Figure 1:
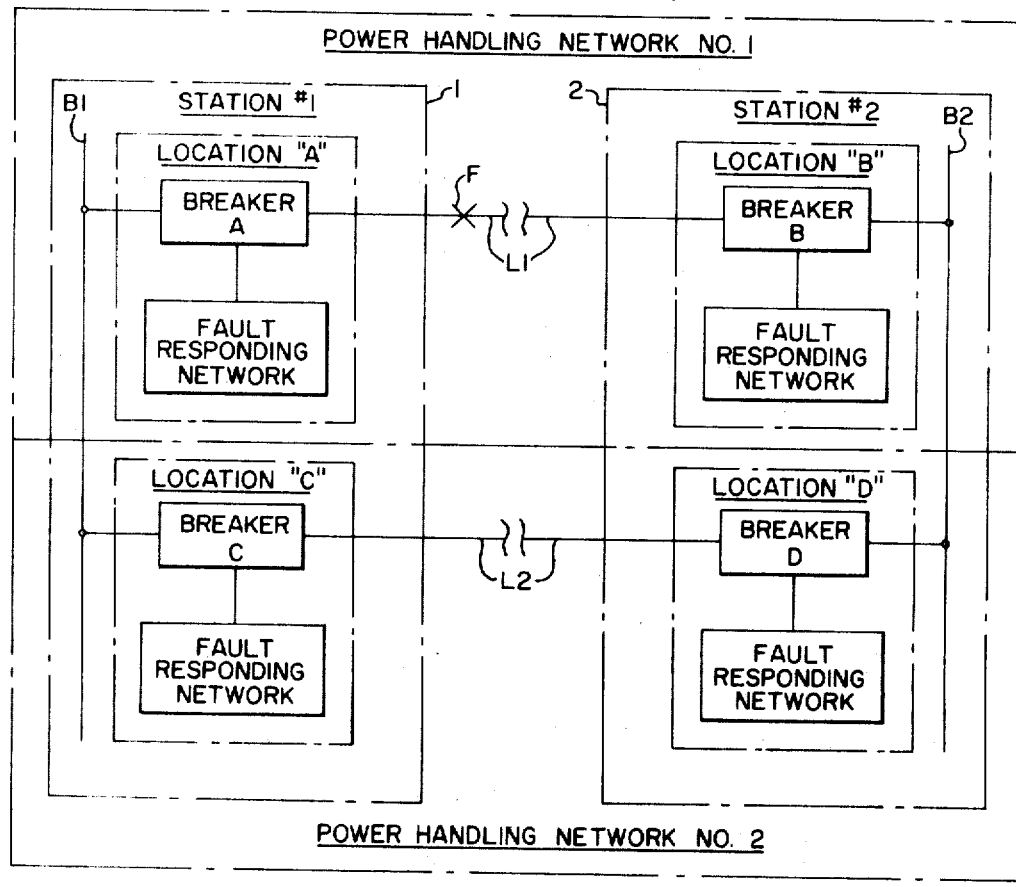
FIG. 1 is a single line diagram showing a pair of substations interconnected by a pair of transmission lines.

Referring to the drawings by characters of reference, the numeral 1 designates a first substation having a bus B1 which may be energized from any suitable source and to which a transmission line L1 is connected through a breaker 1A and to which transmission line L2 is connected through breaker 2C. A second substation 2 having a second bus B2 is suitably energized from one or more sources. The line L1 is connected to bus B2 through breaker 1B. The line L2 is connected to bus B2 through breaker 2D.

Figure 2A:
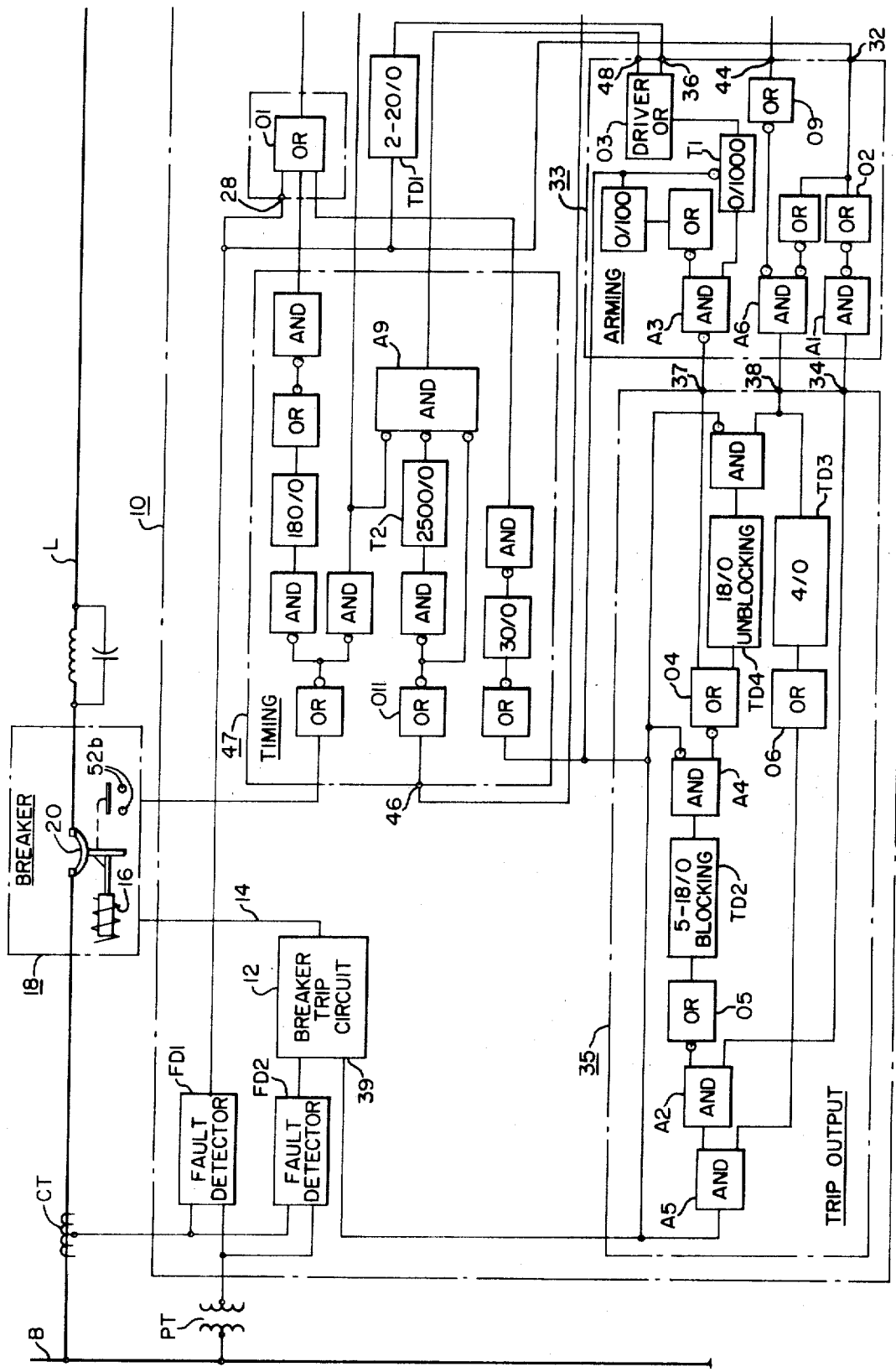
FIGS. 2A and 2B when placed side-by-side show, in block diagram form, a fault responding network embodying the invention.
Figure 2B:
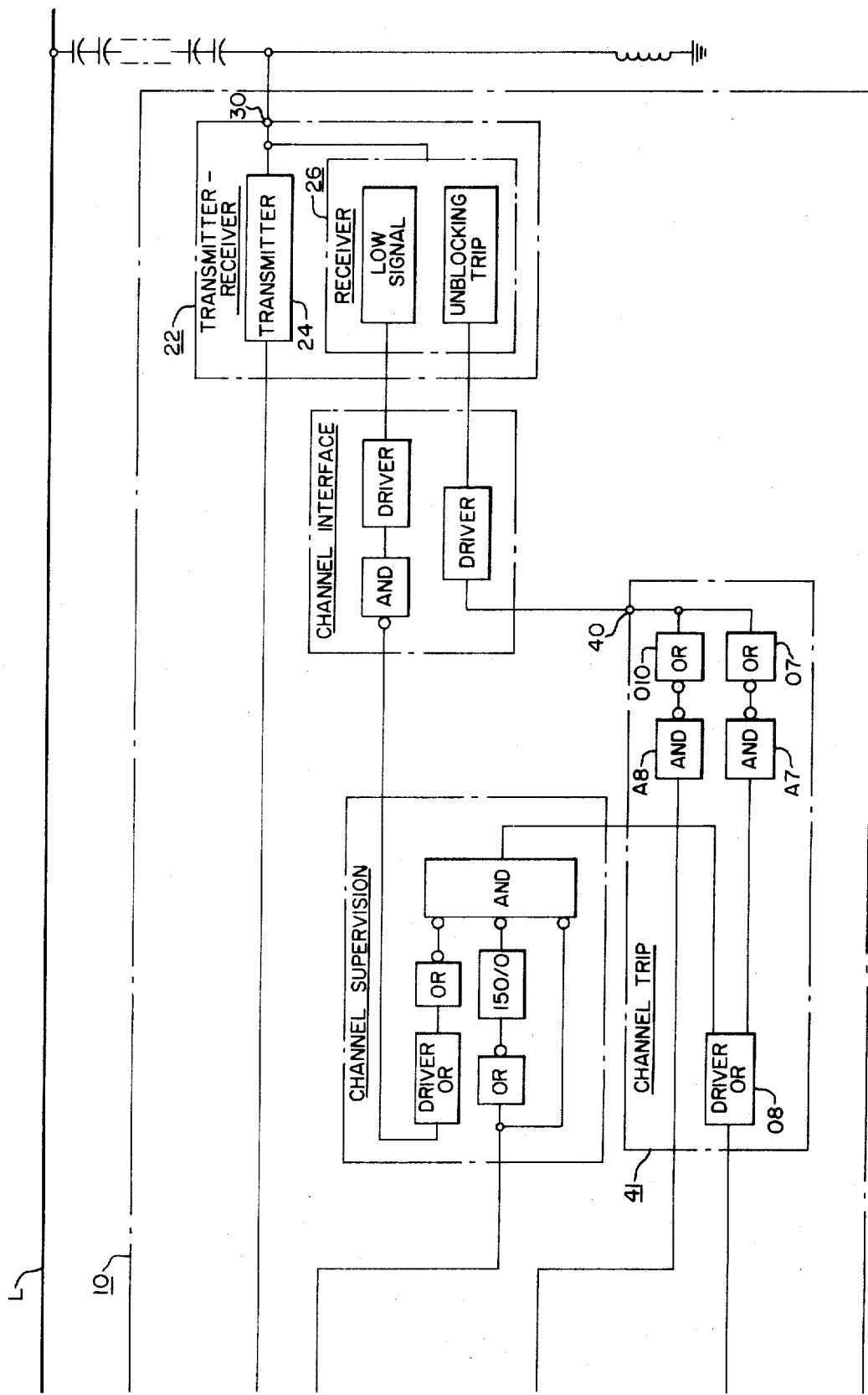

FIG. 2 illustrates a fault responding network 10 associated with a typical breaker 18 which connects a typical line L to a typical bus B. As illustrated therein, the fault responding network includes first and second fault detectors FD1 and FD2 which are supplied with current and voltage signals from the usual current and voltage transformers CT and PT. The detectors may take the form of distance relays which are actuated in response to a flow of fault power outwardly of the bus B into the line L. The detector FD2 responds only to faults of very high current and directly actuates the breaker trip circuit 12 to provide an immediate trip signal over the circuit 14 to energize the trip coil 16 and open the contacts 20 in the shortest possible time. The breaker 18 also includes the usual 52b contacts and which when the breaker is in a condition to connect the line L to the bus B is open circuited and which close when the breaker 18 disconnects the line L from the bus B. The fault detector FD1 responds not only to the high power faults but to fault power of lesser magnitude and consequently will be actuated whenever fault occurs within its reach.

The network 10 further includes an intelligence handling network 22 which includes a transmitting portion 24 and a receiving portion 26. When the fault detector FD1 detects a fault it provides an output signal which is supplied to the first input's connection 28 of an OR device 01 which in turn provides an energizing signal to the transmitting portion 24 of the intelligence handling network 22 which then provides an unblocking signal at its output connection 30. The intelligence networks 22 of the fault responding networks FRA and FRC are interconnected with the fault responding networks FRB and FRD respectively through suitable signal carrying channels illustrated in FIG. 2 as the power line carrier type but which could be of the microwave or leased line type as well.

The output connection of the fault detector FD1 is also connected to the input of a first timer TD1 and to the input terminal 32 of an arming board 33. The input terminal or connection 32 is connected through an OR network 02 and an AND network A1 to the input terminal 34 of a trip output board 35 which includes a breaker tripping network 35B comprising networks A2 and A5. As will be apparent from the drawings a logical 1 output signal of the fault detector FD1 will appear as a logical 1 input signal at the input terminal 34 and the input terminal of an AND network A2 of the trip output board 35.

The output of the time delay TD1 is connected to an input terminal 36 of the arming board 33 which input terminal 36 is connected to one input terminal of a DRIVER-OR network 03; the output terminal of which is connected through a timer T1 to one input terminal of an AND network A3. The output terminal of the AND network A3 is connected to one input terminal 37 of the trip output board 35 which in turn is connected to one input of an OR network 04. The output of the OR network 04 is connected to one input of an AND network A4. The output terminal of the AND network A4 is connected to the input terminal of a transient blocking timer TD2. The output of the transient blocking timer TD2 is supplied through an OR network 05 to a first input terminal 42 of the breaker tripping network 35B which is connected to a first input terminal of the AND network A2. Prior to timing out of the transient blocking timer TD2 the OR network 05 supplies a logical 1 signal to the AND network A2. Therefore when the logical 1 signal is supplied by the fault detector FD1 to a second input terminal 43 of the breaker tripping network 35B, the other input terminal the AND network A2 will provide a logical 1 input circuit to one input terminal of a second AND network A5. The other input terminal of the AND network A5 is connected through the third input terminal 45 of the breaker tripping network 35B and an OR network 06 and a timer TD3 to another input terminal 38 of the trip output board 35. Unless a logical signal is concurrently supplied by the fault detector FD1 and by the receiving portion 26, the AND network A6 of the arming board 33 cannot supply a logical 1 signal to the input terminal 38 to cause the timer TD3 to time out and supply a logical 1 signal to the AND device A5. In the absence of this logical 1 signal, the AND device A5 is prevented from supplying a logical 1 signal from its output to an input terminal 39 of the breaker trip circuit 12 and no tripping of the breaker 18 will occur.

Assuming a condition in which the receiving portion does not supply a logical 1 signal to the input terminal 40 of the channel trip board 41 but the fault detector FD1 is actuated, the time delay TD1 will time out and supply a logical 1 signal to the DRIVER-OR 03, the timer T1, and network A3, OR network 04 to the AND device A4. This initiates the timing out of the transient blocking network timer TD2. At the expiration of its timing period, the logical 1 signal will be removed from the upper input terminal of the AND network device A2 to cause the AND device A2 to remove the logical 1 input signal supplied to the upper input of the AND network A5. This disables the AND device A5 and it no longer is able to supply a logical 1 signal to the breaker trip circuit 12 irrespective of any trip signal or logical 1 signal supplied by the arming board 33 to the input terminal 38 of the trip output board. The time delay networks TD1 and TD2 as well TD3 reset to their initial condition substantially instantaneously with the removal of the logical 1 signal supplied thereto. Therefore, when the fault detector FD1 no longer detects a fault and supplies a logical 0 output signal, the time delays TD1 and TD2 will be substantially instantaneously reset.

In modern day equipment, the fault detector FD1 does not immediately become actuated or does not immediately reset upon the occurrence of or a termination of the fault power flowing from bus B to line L. The interval required to actuate the detector may vary from a low interval of 1 or 2 milliseconds to as much as 8 milliseconds or more depending in the most part on the instant in the sine wave that the fault occurs. Some change in delay may arise because of the fault current magnitude but normally the fault current will be sufficient so that the delay is for all intents and purposes constant with respect to fault current magnitude. The resetting time is generally less and especially so when the fault power reverses.

The relaying apparatus without the inclusion of the time delay TD1 has been on sale since at least as early as Jan. 1, 1970 and is substantially that shown and described in a publication of Westinghouse Electric Corporation and identified as the "Type STU Unblock Relay" IL 41-959.4A available from Relay-Instrument Division, Westinghouse Electric Corporation, 95 Orange Street, Newark, NJ 07101. While the apparatus without the timer TD1 will perform, the addition of this timer TD1 enhances its performance and permits a more accurate control of the transient blocking function when for example two substations are interconnected by two separate power transmitting lines or networks, the breaker operating time is short and the channel time interconnecting the relaying apparatus at the two substations.

For purposes of explanation, it will be assumed that a fault F occurs on the line L1. At the instant the fault occurs, all of the breakers A, B, C and D will be closed and fault power will flow from bus B1 through breaker A to the fault F, from the bus B2 through breaker B and line L1 to the fault F, from bus B2 through breaker D, line L2, breaker C, bus B1 and breaker A to the fault F. Assuming that breaker A opens before breaker B, the opening of breaker A interrupts fault power from the bus B1 to the fault F. The fault power formerly flowing through the line L2 now reverses and flows from bus B1 through breaker C, line L2, breaker D, bus B2, breaker B and line L1 to the fault F. When breaker 1B opens, the line L1 is completely cut off from the busses B1 and B2 and completely interrupts all fault power.

Figure 3:
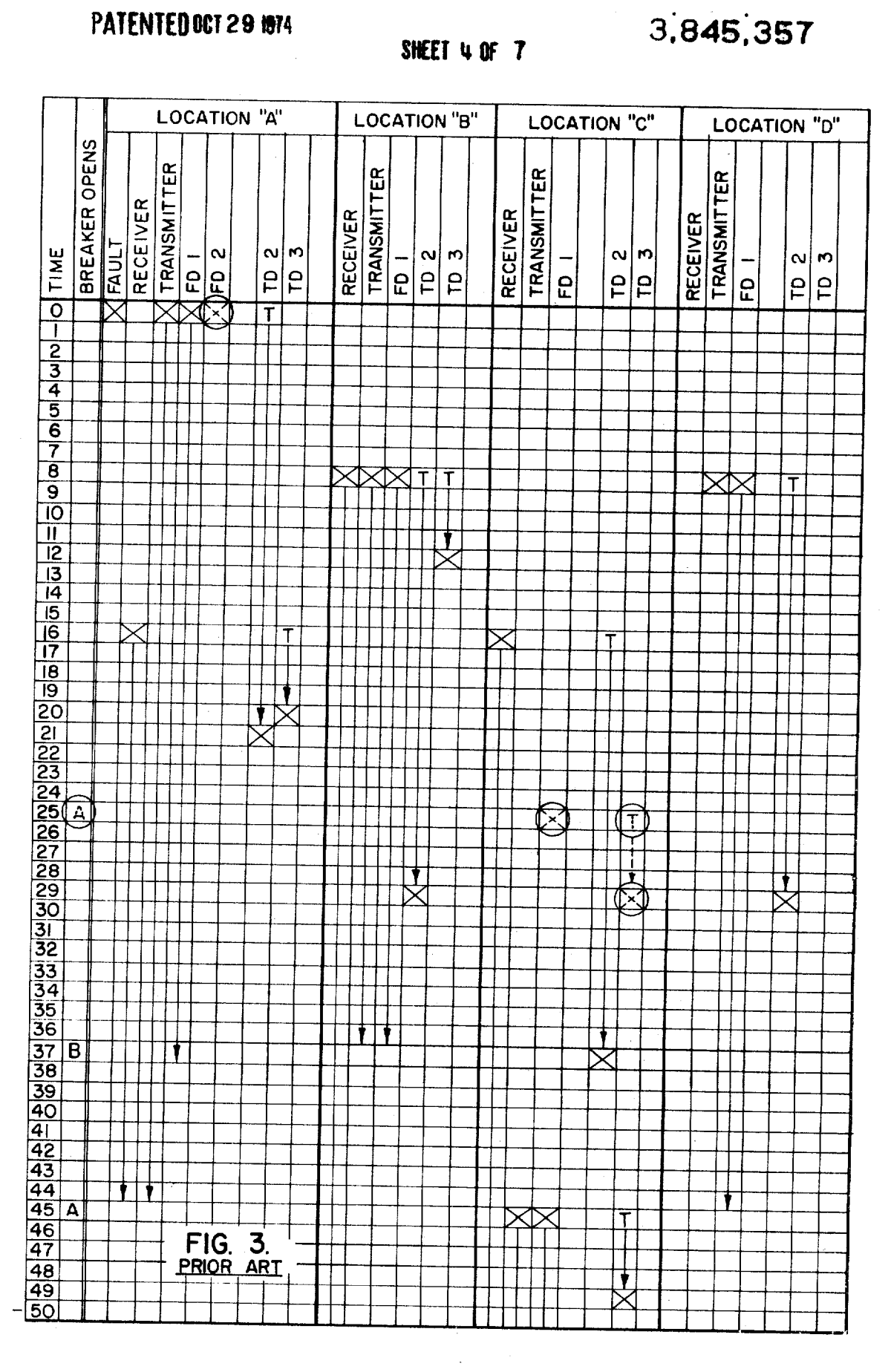

Under the described fault condition, the line L2 is not faulted and neither breaker C nor breaker D should be actuated to open circuit condition. When the fault detector FD1 associated with fault responding network FRD controlling breaker D is actuated because of the fault power flowing through line L2 from the bus B2, the receiving portion 26 of the fault responding network FRC associated with the breaker C receives an unblocking signal. The fault detector FD1 of the network FRC will not be actuated in response to fault power flowing from the line L2 into the bus B1 and breaker C will remain closed. During the interval when the fault power is flowing into the bus B1 its transient blocking timer TD2 is performing its timing function as indicated in FIG. 3. This timer TD2 must time out and disable the AND device before the time instant t30 to insure that the network FRC will not trip the breaker C in response to the reversal of fault power flow through the line L2 which occurs when the breaker A opens prior to the breaker B which is the assumed condition.

If the fault detector FD1 of network FRD had no time delay in resetting and if there was no delay between the termination of the signal to the transmitting portion 24 of network FRD and the termination of the output signal of the receiving portion 26 of network FRC so that the logical 1 signal was immediately removed there would be no possibility that the network FRC would be concurrently energized from its fault detector FD1 and from its receiving portion 26 for a time interval sufficient to time out the security timer TD3 and no possibility of an unnecessary tripping of the breaker C.

During the initial fault period, the fault detector FD1 of network FRD will be actuated and not only cause its associated transmitting portion 24 to transmit the unblock signal to network FRC but will also supply a logical 1 signal at the lower input terminal of AND network A2 so that network A2 will supply a logical 1 arming signal to the upper input terminal of AND network A5.

When the breaker A opens and the fault power in line L2 reverses in direction, the fault detector FD1 of the network FRD will not immediately reset to remove the arming logical 1 signal. If the fault detector FD1 of network FRC is fast acting and the fault detector FD1 of network FRD is slow in resetting and/or the channel time of the power handling network No. 2 (FIG. 1) is longer than 4 milliseconds, the AND network A6 of network FRD could be actuated to provide a logical 1 output signal to its associated timer TD3 for a time interval greater than its 4 millisecond timing period and cause an undesired tripping of the breaker D.

In the prior art apparatus as disclosed in the said Westinghouse Electric Corporation publication wherein the time TD No. 1 is not used, the fault detector FD1 directly initiates the timing operation of the transient blocking timer TD2 so that the AND network A2 of network FRC may under certain conditions, not be disabled by the termination of the unblocking signal from network FRD before the security timer TD3 at FRC times out resulting in an undesired opening of the breaker C. Since the fault F might occur in either line L1 or L2 and in such a manner that the fault power in the unfaulted line could initially flow in either direction and either of the breakers of the faulted line could open first, each of the fault responding networks must be adapted to operate in any of the described positions. It will be apparent from the foregoing discussion and with reference to the time chart of FIG. 3, which illustrates one possible fault combination, and assuming 8 millisecond channels between station No. 1 and station No. 2 and the fault F at the location shown in FIG. 1 and further assuming that for some reason or other FD2 failed to operate and initiate the tripping of breaker A, the earliest time that the breaker trip circuit 12 for breaker A could be actuated would be at time t20 when the timer TD3 times out. This requires a timing interval for timer TD2 of 21 m.s. so that the transient blocking cannot occur until after the AND network A5 has energized the breaker trip circuit. This interval of 21 milliseconds is long enough for the trip circuit 12 at location B to be energized.

Suppose, however, that the fault detector did actuate to energize the breaker trip circuit at location A, the breaker A would open at time t25 and the fault current flowing through line L2 to the fault F would reverse. Assuming the fault detector FD1 at location C responded with minimum delay also at time t25, the associated timer TD3 would time out at time t29. As illustrated in FIG. 3 this is much sooner than transient blocking can occur (t37) and since the AND network A5 of the fault responding network 10 at C is now satisfied it will energize its associated breaker trip circuit 12 and breaker C will be falsely operated.

With the lower transmission voltages on the older lines, the breakers operated much slower in from 3 to 4 cycles of a 60 Hz wave which in the terms of time would be from 50 to 67 milliseconds. With such breakers the percentage difference in the optimum time intervals of the timers TD2 in the networks FRC and FRD was small and a compromise setting which would delay the disabling of the AND networks A2 as long as possible to permit the networks FRC and FRD to be effective to respond to a subsequent fault in line L2 and yet insure the disabling of the AND networks A2 before the time in which the networks FRC and/or FRD could undesirably open the breakers C and/or D.

With the modern trend to higher and higher transmission voltages and the consequent increase in fault power when a fault occurs, faster opening breakers became necessary and as a consequence modern breakers of guaranteed 2 cycle opening time have been developed and faster breakers are being developed. Because of manufacturing tolerances some of these modern breakers open in as short a time as 25 milliseconds or less. The time chart of FIG. 3 also illustrates the timing when the breaker opens at 25 milliseconds after the occurrence of the fault F, it being assumed that with the closeness of F to the breaker 1A that a sufficient magnitude of fault power existed to cause the fault detector FD2 to actuate the breaker trip circuit 12 of network FRA directly and that the line L1 is long enough so that only the fault detector FD2 of the network FRB was not actuated by the fault.

When the breaker A opened as illustrated in FIG. 3 by the letter A within the circle, the direction of the fault power reversed and assuming a fast acting fault detector FD1 at location C, the security timer TD3 at location C will commence to time as indicated by the letter T within the circle. Even assuming that the fault detector FD1 at location D immediately reset, it would take an additional 8 milliseconds for the receiver 26 at location C to reset the timer TD3 and prevent the actuation of the AND network A5 at location C to prevent energization of the breaker trip circuit 12 which would occur prior to the timing out of the transient blocking network TD2; which as stated above in connection with fault F and TD2 of the network 10 at location A is the minimum setting to permit response of network 10 at location C to a nearby fault in line L2. Under these conditions breaker C would be falsely actuated.

With applicant's arrangement wherein an additional timer TD1 is provided, the timer TD2 is delayed in its timing operation whenever such operation is initiated by the associated fault detector FD1 so that the minimum time delay afforded by the timer TD2 may be reduced sufficiently to permit the timing out of the timer TD2 at C to disable the AND network A2 prior to the timing out of the security timer TD3 whereby false tripping of breaker C is prevented. As will be discussed more fully below, the optimum time interval for the timer TD1 is the sum of the channel times in each direction and since the channel times in each direction are usually equal TD1 is twice the channel time (formulas (10), (11), (14) and (17)). The optimum intervals of the timers TD2 may be determined as set out below (formulas (3), (8), (12) and (16)).

An examination of the FIG. 4 time chart which illustrates within an 8 millisecond channel time one set of possible operating times of the fault detectors FD1 at the various locations reveals that the security timer TD3 at location B causes a trip signal to be supplied to the breaker B at 12 milliseconds so that as far as network FRB is concerned, the transient blocking timer TD2 of network FRB could time out at anytime after 13 milliseconds and provide a margin time MB of 1 millisecond.

The transient blocking in network FRC should occur before and preferably not until 28 milliseconds after the fault (allowing a 1 millisecond margin, MC). It is assumed that the fault detector FD1 of network FRD operated at the time 8 milliseconds. With a channel time of 8 milliseconds the receiver and timer TD2 at FRC will be actuated at 16 milliseconds. The timing out of the timer TD2 at C is not later than 28 milliseconds with its optimum setting of 12 milliseconds. The optimum time for disabling the AND network A2 of network FRD is 36 milliseconds (assuming the same time margin MD of 1 millisecond).

Referring to FIG. 4, which shows the relative operation of the networks FRC and FRD, it can be seen that the relationships at C may be expressed by two simultaneous equations as follows:

$$tD + Chnl (D \rightarrow C) + TD2C + MC = 30 \qquad (1)$$
$$BKA + tC + TD3C = 30 \qquad (2)$$

wherein tD represents the time at which the fault detector of the network FRD operates;

Chnl (D → C) indicates the channel time; which is the time required for the input signal to the transmitter of the network FRD appear at the output of the receiver of the network FRC;

TD2C represents the time delay of the timer TD2 of the network FRC;

MC represents the margin of coordination of the network FRC;

BKA represents the time after the fault occurs that the breaker A interrupts the current therethrough;

tC represents the time that the fault detector FR1 of the network FRC operates; and, TD3C is the time interval timed out by the timer TD3 of the network FRC. These simultaneous equations may be solved to determine the required maximum magnitude of time delay of the timers TD2. TD2(max) = BKA − tD + tC − Chnl (D → C) + TD3C = MC (3)
Similarly the following two simultaneous equations (4) and (5) for the timer relationships of network FRD may be established.

$$tD + TD1D + TD2D + MD = 34 \quad (4)$$
$$BKA + tC + Chnl (C − D) + TD3D = 34 \quad (5)$$

Equations (4) and (5) for the maximum value of TD1 + TD2 reduce to $$TD1D + TD2D = BKA + tC − tD + TD3D − MD \quad (6)$$

As set out above, a fault responding network 10 may be called on to perform any of the various functions recited for the locations A, B, C and D depending upon the location of the fault F. It is therefore desirable to provide the same timing interval for all of the timers TD1 as well as the same timing interval for all the timers TD2. Therefore, the formula for TD2C may be combined with a formula for TD1D + TD2D to provide the formula for the optimum maximum value of TD1.

$$TD1 = Chnl (D − D) + Chnl (D − C) → 1 \quad (7)$$

Normally the same equipment will be used for the fault responding networks at the opposite ends of the protected line and the time formula reduces to TD1 = 2 Chnl.

The maximum optimum value of the time interval of the timer TD1 is independent of the system components with the exception of channel time while the maximum of timing value of TD2 is dependent upon the relative times at which the fault detectors FD1 of the networks FRC and FRD operate and the actual current interrupting time of the breaker A.

The minimum optimum values of TD2 may be ascertained from the time relationships shown in FIG. 3 for the networks FRA and FRB. Similarly, as described above equations may be derived for the times TD1 + TD2 of network FRA and timer TD2 of network FRB.

$$TD2 (min.) = MB + TD3B + tb = tA − Chnl (A − B) \quad (8)$$

$$[TD1 + TD2] (min.) = MA + TD3A + Chnl (B − A) + tB − tA \quad (9)$$

Subtracting TD2 from TD1 + TD2 provides the formula for TD1

$$TD1 (min.) = Chnl (B − A) + Chnl (A − B) \quad (10)$$

If the channel time A to B is the same as B to A the formula for TD1 (min.) = 2 Chnl.

$$TD1 (min.) = 2 Chnl. \quad (11)$$

With 8 millisecond channels between networks FRA and FRB, it will be apparent that at tA − tB = 8 milliseconds, the minimum value of TD2 is determined to be 5 milliseconds with a 1 millisecond margin with a usual 4 millisecond time delay TD3 at all values of tA − tB which are positive or between 0 and −8 milliseconds. At negative values of tA − tB greater than −8, it will be seen that the minimum value of TD2 increases until at a magnitude tA − tB equal to −15, 12 milliseconds is the minimum value of TD2 to prevent timing out of the timer TD2 of network FRB so that it will not time out prior to the timing out of the corresponding network TD3 of network FRB.

Figure 6:
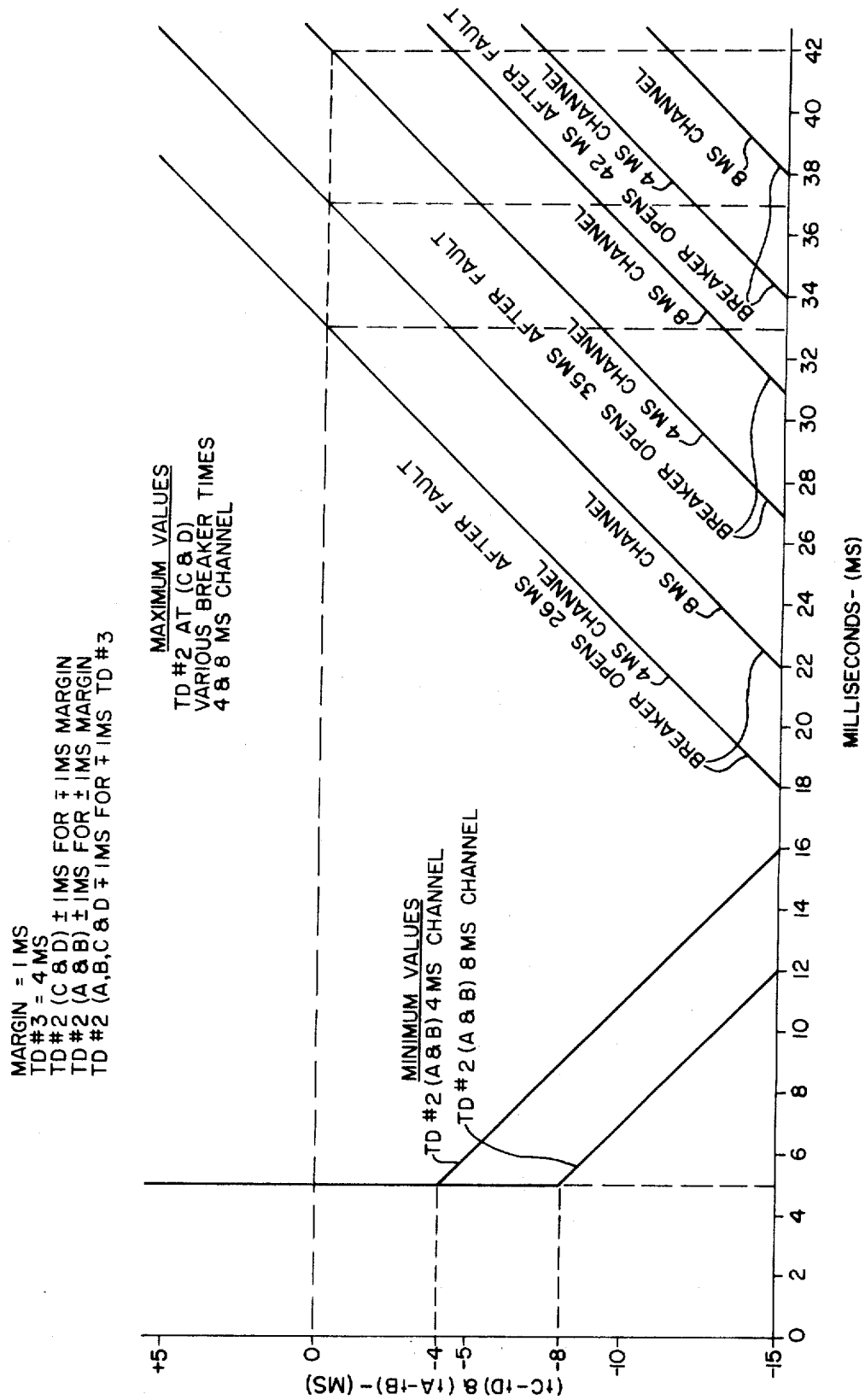
FIG. 6 is a series of curves showing maximum and minimum time values of the transient blocking timer and is useful in understanding the operation of the invention.

With a decreased channel time, as for example 4 milliseconds, the minimum value of TD2 occurs at tA−tB of −4 and the minimum value increases as the value of tA−tB decreases to −15 to 16 milliseconds. It will also be apparent from FIG. 6 that the maximum millisecond value of TD2 of networks FRC and FRD increases 1 millisecond with each increase of milliseconds in channel time and with each increase of 1 millisecond in the current interrupting time of breaker A. FIG. 6 also shows an increase of 1 millisecond of minimum values of TD2 of networks FRA and FRB with each 1 millisecond channel time.

Figure 5:
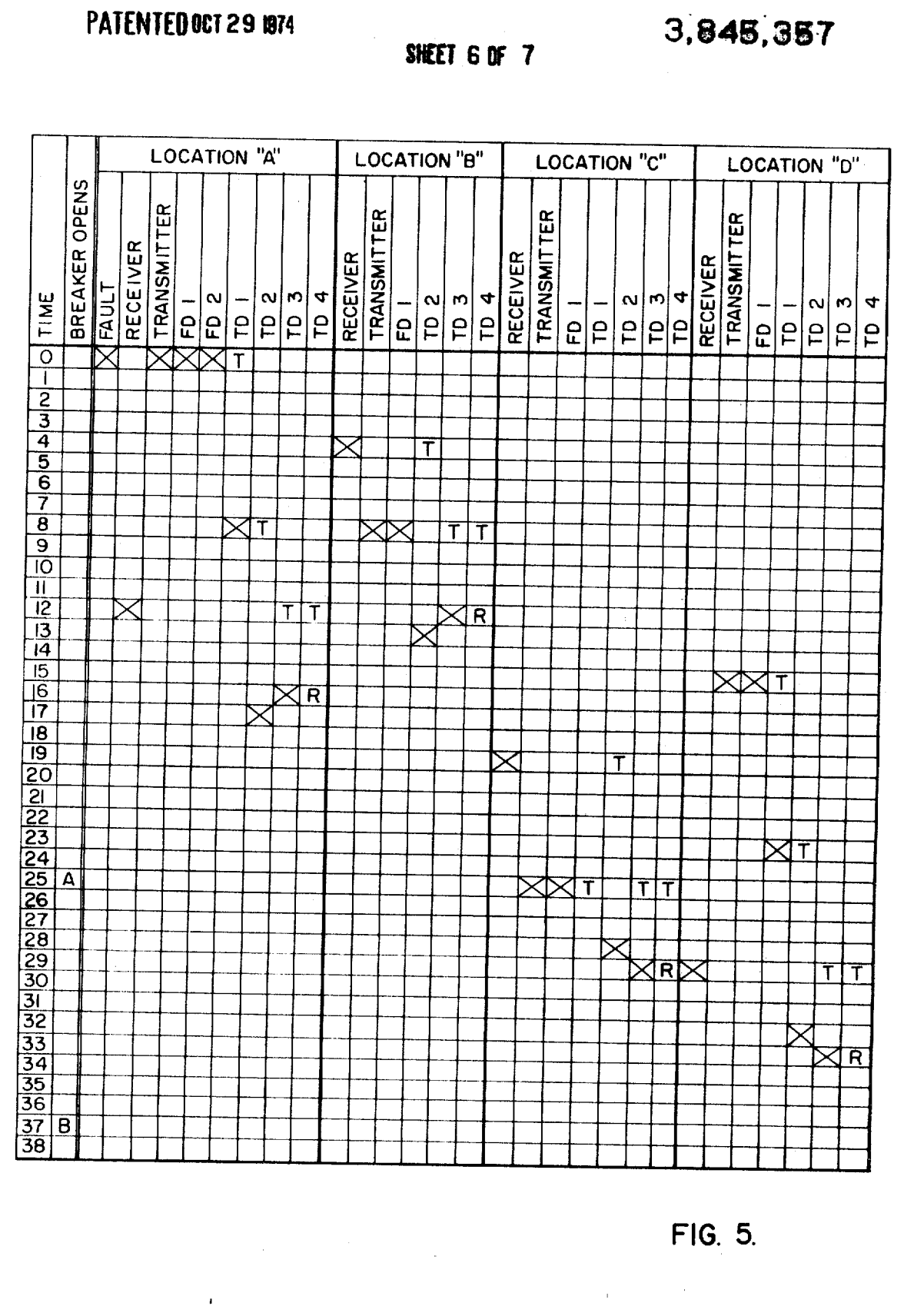

It it is desired to determine the value of TD2 in terms of the time tBKR that is required for the breaker to open after initiation of the breaker trip circuit and with the subscripts following the TD's denoting the location of the TD, (See FIG. 5) the formula may be rewritten as follows:

$$tA + tBKR(A) + tC + TD3(C) = tD + Chnl (D → C) + TD2(C) + MC \text{ or } TD2(C) = tBKR(A) − TD3(C) + tA + tC − tD = MC − Chnl (D → C) \quad (12)$$

$$tA + tBKR + tC + Chnl(C−D) + TD3(D) = tD + TD1(D) + TD2(D) + MD$$

or $MD + [tD − (tA − tC)] = tBKR(A) + Chnl(C−D) + TD3(D) − TD1(D) − TD1(D) + TD2(D) = tBKR(A) + TD3(D) + tA − tC − tD − MD + Chnl ((C → D)$ (13)

by subtracting (12) from (13) and assuming TD2C = TD2D $$TD1(D) = Chnl (C → D) + Chnl (D → C) + MC − MD \quad (14)$$

$$tA + TD1(A) + TD2(A) = tB + Chnl (B → A) + TD3(A) + MA \text{ or } TD1(A) + TD2(A) = MA + tB − tA + TD3(A) + Chnl (B → A) \quad (15)$$

$$tA + Chnl(A−B) + TD2(B) = tB + TD3(B) + MB \text{ or } TD2(B) = MB + TD3(B) − tA + tB − Chnl (A → B) \quad (16)$$

by subtracting 16 from 15 and assuming TD2A = TD2B $$TD1(A) = Chnl (A → B) + Chnl (B → A) + MA − MB \quad (17)$$

If it is assumed that MA = MB and MC = MD, equations (14) and (17) reduce to $$TD1(C) = TD1(D) = 2 Chnl (C → D) \quad (18)$$
$$TD1(A) = TD1(B) = 2 Chnl (A → B) \quad (19)$$

If it is also assumed that all of the channel times are equal then $$TD1(A) = TD1(B) = TD1(C) = TD1(D)$$

Again if it is assumed that tD = tB+tC and TD2(B) = TD2(C) and adding equations (12) and (13)

$$TD2 = tBKR/2 + TD3 − Chnl \quad (20)$$

This simplifed value of TD2 will increase the margin time at locations A and B but since both of these breakers are to be opened, any delay in the timing out of TD2 beyond the timing out of TD3 is immaterial; it being the timing out of TD2 before the timing out of TD3 at locations C and D which is important.

Figure 7:
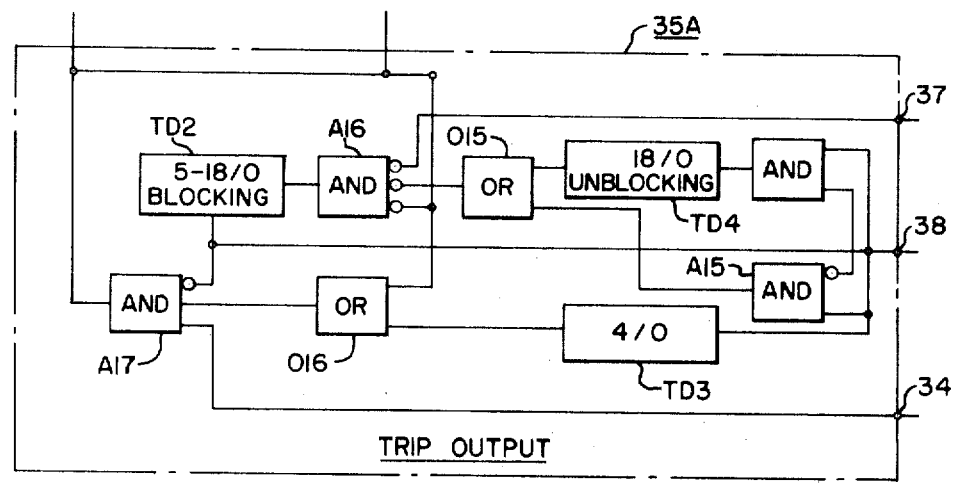
FIG. 7 is a schematic diagram showing a modified form of the trip output board.

FIG. 7 shows a modified form of trip output board 35A wherein like elements to those in the trip board 35 are referred to by the same characters of reference. The trip board output board 35A includes an AND device A15 which has its lower input terminal connected to the board input terminal 38 and has its input terminal connected to the output terminal of the transient blocking timer TD2. The output terminal of the AND device A15 is connected to one input terminal of an OR device O15 which has its output terminal connected to one of the NOT input terminals of an AND device A16. The output terminal of the AND device A16 is connected to the input terminal of the transient blocking network TD2. The input terminal 37 of board 35A unlike the input terminal 37 of the board 35 is connected to one of the NOT input terminals of the AND network A16 and to the NOT input terminal of the AND device A17, which performs the functions performed by the AND networks A2 and A5 of the board 35. The output of the AND device A17 is connected to the lower NOT input terminal of AND device A16 and to one input terminal of an OR device 016, the output terminal of which is connected to one of the input terminals of the AND device A17. The other input terminal of the OR device 016 is connected to the output terminal of the time delay TD3. It will be apparent that if the timing device TD2 has not timed out and a logical 1 signal is received at the input terminal 38 the AND network A15 will supply a logical 1 signal through the OR network 015 to a NOT input terminal of the AND network A16 and thereby terminate the further operation of the timing timer TD2 and reset it to its initial condition.

What is claimed and is desired to be secured by U.S. Letters Patent is as follows:

1. In a protective relay for protecting a transmission line energized from a station bus through a breaker, a fault detector having an input circuit adapted to be energized with a line condition responsive quantity which varies as a function of an operating condition of the line and having an output circuit the energization of which changes upon the occurrence of an abnormality in said the responsive quantity, an intelligence handling device having a transmitting portion and receiving portion, said output circuit of said fault detector being connected to said transmitting portion for actuation thereof upon the occurrence of an abnormality in said line responsive quantity, a breaker tripping network having an output circuit and first and second and third input circuits, a plurality of timers, each said timer having an input circuit and an output circuit, each said timer being effective to change its output quantity at its said output circuit from an initial quantity to a timed-out quantity at the expiration of a predetermined programmed time interval following a change of an input quantity from a reset quantity to a timing quantity at its said input circuit, said output circuit of said fault detector being connected to provide a timing quantity to said input circuit of a first of said timers when said fault detector detects said abnormality, said output circuit of said first timer being connected to said input circuit of a second of said second timers and effective to supply said input circuit of said second timer with its said timing quantity upon the occurrence of said timed-out quantity of said first timer and independently of the operation of said receiving portion, said receiving portion being connected to said input circuit of said second timer and effective to provide said second timer with its said timing quantity when said receiving portion receives a first remote control quantity, said output circuit of said second timer being connected to said first input circuit of said breaker tripping network and effective as a consequence of the occurrence its said timed-out quantity to interrupt the supply of a first control quantity to said first input circuit of said tripping network, first circuit means connecting said output circuit of said fault detector to said second input circuit of said breaker tripping network and effective to supply a second control quantity to said second input circuit of said breaker tripping network upon the occurrence of said abnormal line responsive quantity, said third input circuit of said breaker trippig network being connected to said receiving portion, said receiving portion being effective to supply a third control quantity to said third input circuit in response to the reception by said receiving portion of said first remote control quantity, said breaker tripping network being effective to actuate its said output circuit when its said first and second and third input circuits are actuated by said first and second and third control quantities respectively.

2. The combination of claim 1 wherein said first circuit means comprises a first input circuit and an output circuit of a first AND device, said output terminal of said AND device being connected to said second input terminal of said tripping network and said first input terminal of said AND device being connected to said output circuit of said fault detector, said AND device having a second input circuit connected to said receiving portion, said AND device being effective to supply said second control quantity solely when both said fault detector is responding to said abnormal line quantity and said receiving portion is receiving said first remote control quantity.

3. The combination of claim 2 which comprises a control network interconnecting said output of said first AND device and said input circuit of said second timer, said control network being effective to prevent timing out of said interval when said AND device is supplying its said second control quantity.

4. The combination of claim 3 which comprises a second AND device having a plurality of input connections and an output connection, a first of said input connections of said second AND device being connected to and energized by said receiving portion, a second of said input connections of said second AND device being connected to said output of said first AND device, a third of said input connections of said second AND device being connected to said output circuit of said breaker tripping network, said output connection of said second AND device being connected to said input circuit of said second timer.

5. The combination of claim 4 comprising a third AND device having an output connection and a plurality of input connections, a first of said input connections of said third AND device being connected to said output of said first AND device, a second of said input connections of said third AND device being connected to said output circuit of said second timer, and said output circuit of said third AND device being connected to said second input circuit of said second AND device.

6. The combination of claim 2 comprising a third of said timers interposed between said output terminal of said AND device and said second of said input circuits of said tripping network.

7. The combination of claim 6 comprising a second transmitting portion operatively connected to said receiving portion through a transmitting channel, said channel having a channel time equal to the time interval between the time that said second transmitting portion receives its signal and the time said signal is provided at the output of said receiving portion, said predetermined time interval of said first timer being substantially equal to twice the magnitude of said channel time.

8. The combination of claim 7 in which said predetermined time interval of said second timer is substantially equal to the magnitude of a first design time constant minus the said channel time.

9. The combination of claim 8 comprising a circuit breaker having contacts adapted to open and interrupt the current flow between said bus and said line in a minimum interrupting time interval subsequent to the application of a tripping signal to its tripping circuit, said output of said tripping network being connected to said tripping circuit and operable when activated to supply said tripping signal, said constant being equal to the sum of said minimum interrupting time interval of said breaker and a second design time constant.

10. In combination, a plurality of circuit breakers, each said breaker having current controlling contacts and means to open said contacts upon the application of a tripping signal thereto whereby current flow through said contacts is interrupted in a minimum interrupting time interval, a first power handling network including a first power transmission line connected at a first end portion to a first power bus through said contacts a first of said breakers and connected at a second end portion to a second power bus through said contacts of a second of said breakers, a second power handling network including a second power transmission line connected at a first end portion to said first power bus through said contacts of a third of said breakers and connected at a second end portion to said second power bus through said contacts of a fourth of said breakers, a plurality of fault responding networks, each of said fault responding networks comprising a fault detector and an intelligence handling device and a breaker tripping network and a connecting network, each said connecting network including a plurality of timers, each said fault detector having an input circuit and an output circuit and being effective to actuate its said output circuit in response to the actuation of its said input circuit by an abnormal line responsive quantity, each said intelligence handling device including a transmitting portion having an input circuit and an output circuit and further including a receiving portion having an input circuit and an output circuit, each said breaker tripping network comprising an output terminal and first and second and third input terminals, each said breaker tripping network being effective to provide a tripping signal at its said output terminal solely when first and second and third control quantities are supplied to its said first and second and third input terminals respectively, each said timer having an input circuit and having an output circuit each said timer being effective to change its output quantity at its said output circuit from an initial quantity to a timed-out quantity at the expiration of a predetermined programmed timing interval subsequent to a change in the input quantity supplied to its said input circuit from a reset quantity to a timed-out quantity, a first and a second of said fault responding networks having said input circuit of their said fault detectors operatively connected to said first power handling network adjacent said first breaker and said second breaker respectively whereby said fault detectors of said first and second fault responding networks respond to the operating condition of said first line, a third and a fourth of said fault responding networks having said input circuits of their said fault detectors operatively connected to said second power handling network adjacent said third and said fourth breakers respectively whereby said fault detectors of said third and fourth fault responding networks respond to the operating condition of said second line, first and second intelligence transmitting channels interconnecting said first and second fault responding networks, said first channel including said transmitting portion of said first fault responding network and said receiving portion of said second fault responding network, said second channel including said transmitting portion of said second fault responding network and said receiving portion of said first fault responding network, third and fourth intelligence transmitting channels interconnecting said third and said fourth fault responding networks, said third channel including said transmitting portion of said third fault responding network and said receiving portion of said fourth fault responding network, said fourth channel including said transmitting portion of said fourth fault responding network and said receiving portion of said third fault responding network, each of said channels having a channel time interval equal to the time interval between the application of a transmitting signal to said input circuit of its said transmitting portion and the resulting actuation of said output circuit of its said receiving portion, said output circuit of said fault detector of each said fault responding network being connected to said input circuit of its associated said transmitting portion and to said input circuit of a first of its associated said timers whereby its associated said transmitting portion is effective to transmit an intelligence signal over its associated said channel and its associated said first timer is provided with a timing quantity in response to a said abnormal line responsive quantity in its associated said power handling network, each said connecting network including means connecting said output circuit a second of its said timers to said first terminal of its said breaker tripping network and including means connecting said input circuit of a third of its said timers to said output circuit of its said receiving portion, said output circuit of said fault detector of each said fault responding network being connected to said second terminal of its associated said breaker tripping network, said first timer of each of said connecting networks having its said output circuit connected to said input circuit of said second timer of its associated said fault responding network and effective to supply said timing quantity as a consequence of the existence of said timed-out quantity at said output circuit of said first timer and independently of the operating condition of the associated said receiving portion, said output circuit of said receiving portion of each said fault responding network being connected to said third terminal of its associated said breaker tripping network, said connecting network of each said fault responding network operatively connecting said output circuit of its said second timer to said first input terminal of its said breaker tripping network.

11. The combination of claim 10 in which each of said fault responding networks comprises a third of said timers connected intermediate said output of its said receiving portion and said third terminal of its said breaker tripping network.

12. The combination of claim 10 in which said predetermined timing interval of said first timers of said one and of said other fault responding networks is substantially the sum of said channel times of said intelligence channels associated therewith.

13. The combination of claim 10 in which said first timers of said one and of said other fault responding networks have a time interval substantially twice that of the time interval of one of its said associated channels.

14. The combination of claim 12 in which the time interval between the occurrence of a fault on one of said lines and the actuation of the first to be actuated of said fault detectors of the said fault responding networks associated with the other of said lines is equal to $t_d$, said first to actuate of said fault detectors being associated with the one of said fault responding networks which is associated with said other line, the time interval between the occurrence of said fault and the opening of first-to-open of said breaker associated with said one line is equal to BKA, the time interval between the opening of said first-to-open breaker and the actuation of the other of said fault detectors of the other of the said fault responding networks associated with said other line is equal to $t_c$, the margin time interval between the timing out of said second timer of said other fault detector of said other fault responding networks and the time of the occurrence of said tripping signal at said output terminal of said breaker tripping network of said other fault responding network being equal to $M_c$, the channel time of said channel which is associated with transmitting portion of said other fault responding network being equal to Chnl (D−C), said time interval of said second timer of said other fault responding networks being equal to TD2 and equal to the expression $TD2 = BKA - [t_d - t_c] - [Chnl\ (D-C)] - M_c + $ a constant.

15. The combination of claim 14 in which said other fault responding network comprises a third of said timers connected intermediate said output of its said receiving portion and said third terminal of its said breaker tripping network, said constant being equal to TD3 which is equal to the timing interval of said third timer of said other fault responding network.

16. The combination of claim 15 in which said one fault responding network comprises a third of said timers connected intermediate said output of its said receiving portion and said third terminal of its said breaker tripping network, said time periods of said second timer and said third timer of said one fault responding network having the same time periods as said second timer and said third timer of said other fault responding network.

17. The combination of claim 16 in which said fault responding networks associated with said faulted power handling network associated with said one line each include a third of said timers connected between said output of its said receiving portion and said third terminal of its said breaker tripping network, said first timer of a first said fault responding network associated with said faulted power handling network having a time interval equal to substantially the total of said channel time of said intelligence channels associated therewith, the timing interval of said second timers of said fault responding networks associated with said faulted power handling network having a magnitude not less than TD2 when $TD2 = M_b + [t_b - t_a] + TD3 - Chnl\ (A-B)$, the time interval between the occurrence of said fault on said one line and the actuation of the first-to-be-actuated of said fault detectors of the said fault responding networks associated with said one line is equal to $t_a$, said first-to-be-actuated of said fault detectors of said fault responding networks associated with said one line being associated with a first of said just-mentioned fault responding networks, the time interval between the occurrence of said fault and the actuation of the said fault detector associated with the second fault responding network of said fault responding networks associated with said one line is equal to $t_b$, the time interval of said intelligence channel which is associated with said transmitter portion of said first fault responding network and said receiving portion of said second fault responding network is equal to Chnl (A−B), the timing interval of said third timer is equal to TD3, and the time interval between the occurrence of said tripping signal at said output terminal of said second fault responding network and the timing out of said second timer of said second fault responding network is equl to $M_b$.

18. The combination of claim 17 in which the timing intervals TD1 and TD2 of said first and second timers respectively of said first fault responding networks are not less than that represented by $TD1 + TD2 = M_a + (t_b - t_a) + Chnl\ (B-A) + TD3$ where Chnl (B−A) equals the channel time of the intelligence channel associated with said transmitting portion of said second fault responding network and said receiving portion of said first fault responding network, and $M_a$ equals the time interval between the occurrence of said tripping signal at said output terminal of said first fault responding and the timing out of TD2.

19. The combination of claim 18 in which the intervals of TD1, TD2 and TD3 of the fault responding networks associated with said faulted power handling network are equal respectively to the corresponding intervals of the timers TD1, TD2 and TD3 of said fault responding networks which are associated with the non-faulted said power handling network.

20. The relay of claim 1 including a fourth of said timers, network means connecting said input circuit of said fourth timer to said receiving portion and said output circuit of said fourth timer to said input circuit of said second timer, said network means being effective when said output circuit of said fourth timer is energized with its said timed-out quantity to provide said input circuit of said second timer with its said reset quantity irrespective of the operation of said fault detector.

21. The relay of claim 20 in which the sum of said programmed time intervals of said first and second timers is greater than said programmed time interval of said third timer.

22. The relay of claim 21 in which the time interval required for said second timer to change said quantity at its said output circuit from its said timed-out quantity to its said initial quantity in response to a change in said quantity at its said input circuit from its said timing quantity to its said reset quantity is less than its said programmed time interval.

23. The combination of claim 10 in which each said fault responding network includes a fourth of said timers and network means connecting said input circuit of said fourth timer to said receiving portion and to said input circuit of said second timer of the associated said fault responding network, each said receiving portion being effective when receiving intelligence corresponding to a said abnormal line quantity to cause said input circuit of the associated said fourth timer to be energized with its said timing quantity said output circuit of each said fourth timer being effective when energized with its said timed-out quantity to energize said input circuit of its said second timer with its said reset quantity.

24. A relaying apparatus for protecting a section of a power transmission line having first and second end portions, said apparatus comprising a fault detector for detecting the existence of a power line fault as determined at said first end portion of said line, an intelligence receiving portion for supplying a fault signal when fault power is flowing into said line section at said second end portion of said line section, first and second and third timers, each said timer having an input circuit and an output circuit, each said timer being effective to change its output quantity at its said output circuit from an initial quantity to a timed-out quantity at the expiration of a predetermined programmed time interval following a change of its input quantity at its said input circuit from a reset quantity to a timing quantity, an OR network having first and second inputs and an output, means connecting said output circuit of said first timer to said first input of said OR network and said output of said OR network to said input circuit of said second timer, means connecting said receiving portion to said second input of said OR network and including said third timer, said OR network being effective upon the existence of said timed-out quantity of said first timer to supply said timing quantity to said second timer independently of the operation of said receiving portion, said receiving portion being effective in the absence of said fault signal to supply said reset quantity to said input circuit of said third timer thereby to supply said timing quantity upon the occurrence of said fault signal, said OR network being effective to supply said input circuit or said second timer with its said timing quantity when said output circuit of said third timer is energized with said timed-out quantity.

25. The apparatus of claim 24 including a breaker tripping network having first and second and third inputs and an output, means connecting said first input of said breaker tripping network to said output circuit of said second timer whereby said first input of said network is energized with a first control quantity solely when said output circuit of said second timer is energized with its said initial quantity, means connecting said fault detection to said second input of said breaker tripping network whereby said second input of said network is energized with a second control quantity solely when said fault detector detects the existence of a power line fault, and means connecting said receiving portion to said third input of said tripping network whereby said third input of said network is energized with a third control quantity solely when said receiving portion is receiving said fault signal, said tripping network being effective to provide a tripping quantity at its said output solely when all of its said inputs are energized with control quantities.

* * * * *